Patented June 3, 1941

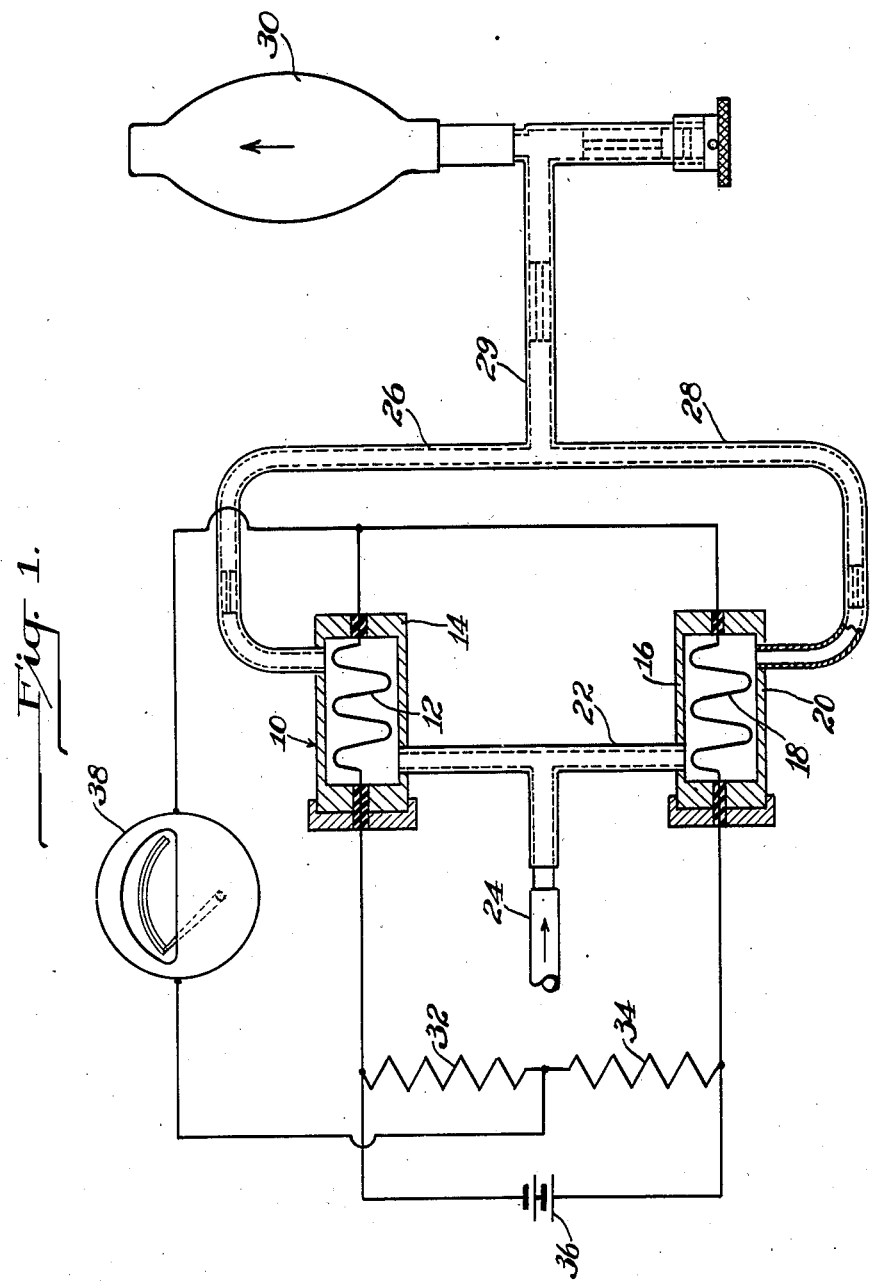

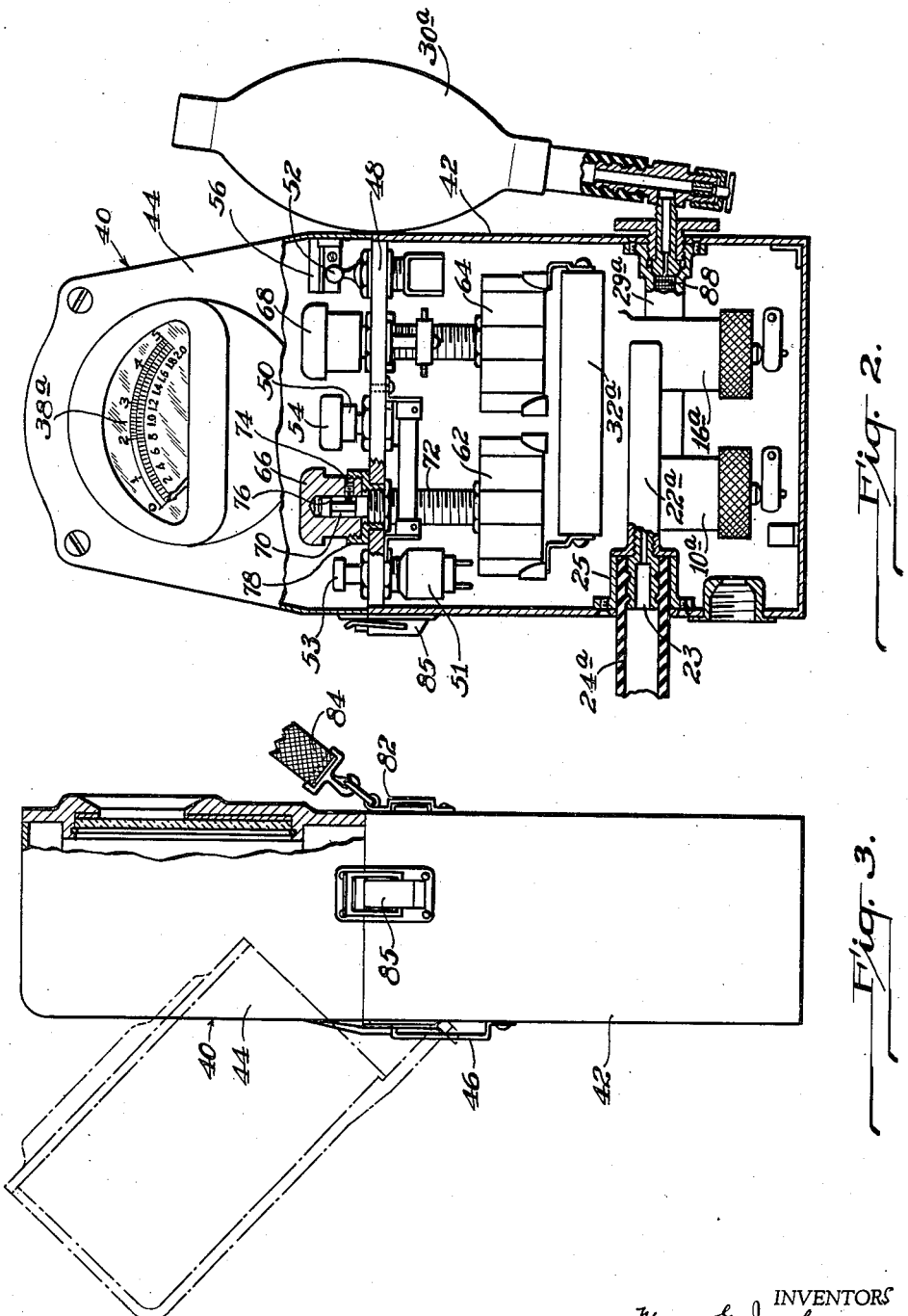

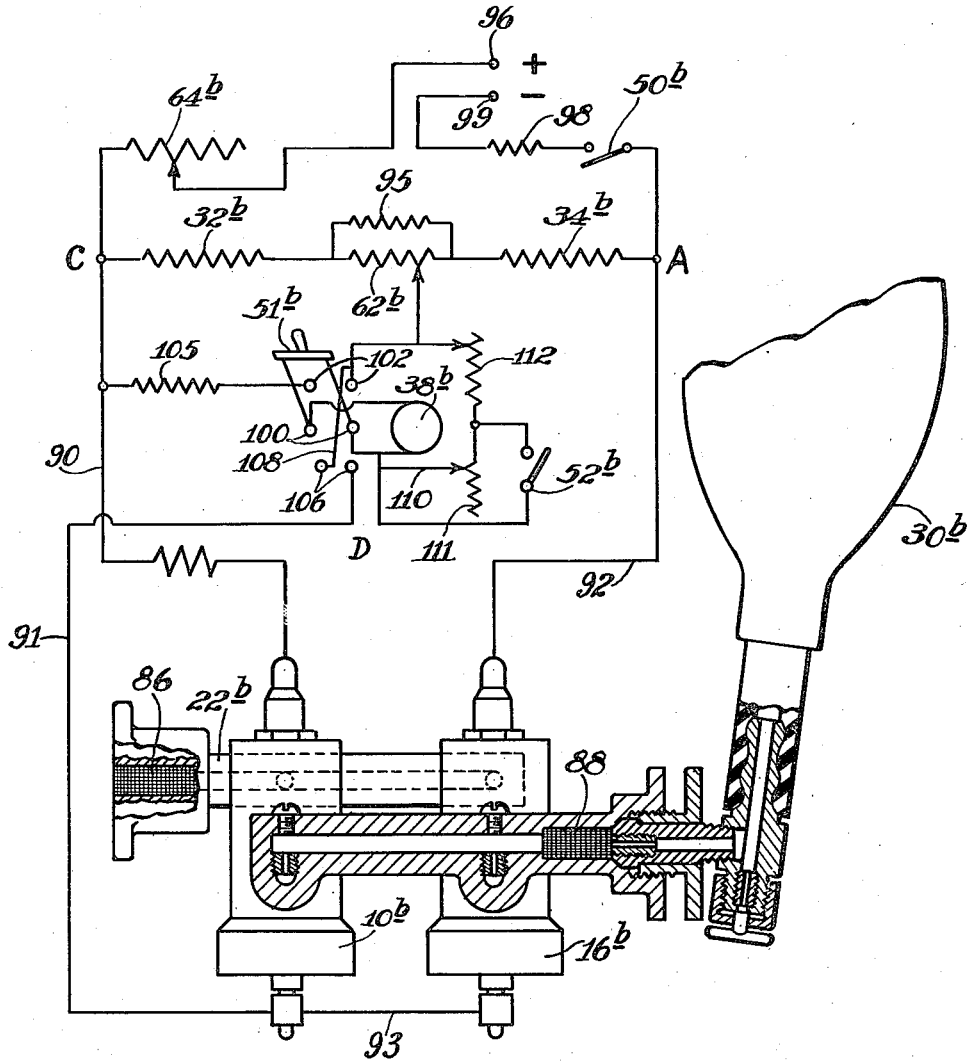

2,244,366

UNITED STATES PATENT OFFICE 2,244,366

COMBUSTIBLE GAS INDICATOR

Moses G. Jacobson, Pittsburgh, and Ralph E. Hartline, Swissvale, Pa., assignors to Mine Safety Appliances Company, Pittsburgh, Pa., a corporation of Pennsylvania Application November 24, 1937, Serial No. 176,163

13 Claims. (Cl. 23—232)

This invention relates to improvements in gas testing, and more particularly is concerned with improved methods and apparatus for the detection and quantitative determination of combustible gases in air, and especially of methane in mine atmospheres.

Apparatus and methods heretofore provided for determining the presence and amount of combustible gases in air have been adversely influenced by variations in the humidity of the air. Some attempts have been made to overcome the effect of humidity by employing calcium chloride or other drying agents to eliminate this influence. The use of such drying agents, however, is open to the objection that they are bulky, expensive and must be frequently replaced.

Ordinarily, apparatus, such as has been employed for determining the existence of and the amount of combustible gas in air, includes a pair of electrically heated filaments in an associated Wheatstone bridge circuit and two electrical adjustments are necessary before every test. The first adjustment is to bring the voltage passing through the filaments to the correct value and thereby insure that the filaments have the proper initial temperature and the correct sensitivity. The second adjustment is to balance the circuit in the presence of pure air on the filaments so that the associated bridging galvanometer indicates zero. These two adjustments are time consuming and tend to require the use of a trained operator for the apparatus. Moreover, since one or both of the electrical adjustments have to be made in pure air a serious problem arises when working with the apparatus in an atmosphere containing combustible gases, as in a mine, with fresh air a substantial distance, sometimes miles, away.

Moreover, the devices previously available are difficult to carry and operate upon a single person when the only illumination provided for the operation is by an electric miner's lamp worn upon the hat of the person.

It is the general object of our invention to avoid and overcome the foregoing and other difficulties of and objections to prior known gas testing methods and apparatus by the provision of improved methods and apparatus for determining the presence and amount of combustible gas present in air and particularly adapted for determining the methane content in mine atmosphere.

Another object of our invention is to provide gas testing methods and apparatus in which only a single electrical adjustment need be made prior to each test.

Another object of our invention is the provision of methods and aparatus for determining the combustible gas content of air and wherein the apparatus can be properly adjusted for test in atmospheres containing combustible gas, as in a mine.

Another object of our invention is to provide methods and apparatus which are not affected by changes in humidity for determining the amount of combustible gas present in air.

Another object of our invention is the provision of improved gas testing apparatus of the character indicated which can be readily carried by a single operator and which is quickly adapted to perform the desired test with no other illumination than that provided by a miner's electrical cap lamp.

Other objects of the invention include the provision of gas testing apparatus having a hinged top carrying the indicating galvanometer, the provision of push-pull switches for automatically closing all circuits and making the instrument ready for use when the top of the case is opened; the provision of other switches also operated by the top of the case for switching the circuits so as to provide an indication of greater or less sensitivity; and the provision of operating knobs for the various adjustable parts of the apparatus, which knobs can be locked in inoperative position.

The foregoing and other objects of the invention are achieved by the provision of apparatus such as shown in the accompanying drawings wherein Fig. 1 is a schematic arrangement of one embodiment of our invention; Fig. 2 is a front elevation, partly broken away and shown in section, of a complete testing instrument; Fig. 3 is a side elevation, partly broken away, of the apparatus shown in Fig. 2; and Fig. 4 is a view similar to Fig. 1 but illustrates the complete electrical connections of the apparatus of Fig. 1.

In the schematic representation of a typical embodiment of our invention as shown in Fig. 1, the numeral 10 indicates generally a detector unit having a filament 12 positioned therein so that gas passed through a housing 14 surrounding the filament will pass over the filament which will burn any combustible matter present in the gas, as hereinafter described. A compensator unit 16, constructed generally similar to the detector unit 10, and including a filament 18, and a housing 20 is included in the apparatus and the housings 14 and 20 are connected with a conduit 22 in turn connected removably to a conduit 24 extending to the source of the gas to be tested. The housings 14 and 20 of the detector and compensator units, respectively, are also connected by conduits 26, 28, and 29 with an aspirator bulb 30. By pumping on the bulb 30 gas is drawn through the conduit 24, the conduits 22, the housings 14 and 20, the conduits 26 and 28 and out of the bulb. In this manner the gas to be tested is drawn over the filaments 12 and 18 of the detector and compensator units.

The filaments 12 and 18 are connected in a Wheatstone bridge circuit including resistances 32 and 34 wherein the value of the several resistances satisfies the proportion $$\frac{R12}{R18} = \frac{R32}{R34}$$

assuming the apparatus to be operating in pure air. A battery 36 supplies electric current to the opposite ends of the resistances 32 and 34, and a galvanometer 38 connected across the mid points of the Wheatstone bridge indicates any change in the resistance of the detector filament 12. By making the compensator filament 18 inactive to the presence of combustible gas in the gas tested, and at the same time permitting the detector filament 12 to burn the combustible content of the gas tested, the Wheatstone bridge is unbalanced and the galvanometer 38 can be calibrated for combustible content, for example, in per cent methane present in the gas sample. It will be recognized that the amount of combustible matter present in the gas directly controls the change of resistance of the detector filament 12 since the increase in the temperature of the filament due to the burning of the combustible gas effects the increase in the resistance of the detector filament.

An important part of our invention is to adapt the apparatus, as schematically described above, to operation unaffected by humidity changes. This is accomplished by passing the gas tested over both the detector filament 12 and the compensator filament 18 simultaneously, as just described, so that any cooling or heating effects due to humidity, temperature or rate of flow of the tested gas affect both sides of the bridge equally. However, while this has been broadly proposed heretofore, we have found that it is difficult, if not impossible, to do so without having at least some of the combustible matter present in the gas tested burnt by the compensator filament which results in inaccurate operation of the apparatus. The burning of any combustible material of the compensator filament, which is usually made of the same material as the detector filament, for example, platinum, is eliminated by operating the compensator filament at a temperature below the ignition point of any combustible constituent of the gas passed over the filament. The physical and electrical characteristics of the compensator filament may include such factors as the diameter or length of the filament wire, the pitch or diameter of the helix into which the filament is usually wound, and the specific resistance or thermal coefficient of resistance of the material of the wire. Accordingly, we have found it advisable, first, to increase the diameter of the compensator filament by, for example, from about 10 to about 100 per cent over the diameter of the detector filament and to correspondingly increase its length. A compensator filament of desired resistance to balance and stabilize the bridge is thus provided which does not ignite any combustible gas passed over it.

We have discovered, however, that if a compensator filament wire is employed having a cross-section so greatly increased that the highest current which might possibly be passed through it from the battery used will not raise its temperature to an ignition level, the length of the wire to make its cooling surface large enough to obtain a satisfactory thermal and electrical balance will be beyond the limits of mechanical strength and therefore impractical. Therefore, and as a second step in the manufacture of the compensator filament, we render it inactive by catalytic poisoning or coating of the filament, as for example, by electrically plating the surface of the compensator filament after it is soldered into place. A non-catalytic plating metal such as copper, is employed which is able to produce oxides capable of withstanding high temperatures. After plating, the plated surface is covered with a layer of the temperature-resisting oxides by heating the plated filament with an electric current in the presence of oxygen or air. While we have particularly referred to oxides being formed during heating, we believe, also, that the plating material may alloy with the base metal of the filament during heating. In all events, we have found that a compensator filament formed and treated as described will not become active to methane even after exposures of many hours to high gas concentrations at the highest currents and temperatures obtainable in the apparatus from the battery employed therewith.

Referring to the apparatus shown in Figs. 2 and 3 of the drawings, the numeral 40 indicates generally an instrument case having a box 42 and a top 44 hinged to the box 42 for movement from the full line to the dotted line position shown in Fig. 3. A novel part of our inventive concept is to provide the top 44 and box 42 with engaging means which limit the hinged movement of the top 44 so that it is stopped substantially in the position shown in dotted lines in Fig. 3, i. e., at an angle of between about 30 and 70 degrees with the horizontal. In the form of invention illustrated this is accomplished by providing the top 44 with a lip 46 extending beyond the pivotal mounting of the top and engaging with the back of the box 42 when the top 44 is moved to the open position.

Since in the concrete embodiment of the apparatus shown in Figs. 2 and 3 certain of the parts thereof are shown in Fig. 1 and have been heretofore schematically described, they have been indicated in Figs. 2 and 3 by similar numerals except that the suffix $a$ has been added. Mounted in the box 42 of the instrument case is a compensator unit 16a and a detector unit 10a which are connected to a conduit 22a having a nozzle 23 received in a cup 25 secured to the side of the instrument case and permitting the ready coupling of the conduit 22a with a removable hose or gas conduit 24a. The detector and compensator units 10a and 16a are connected to the aspirator bulb 30a by a conduit 29a, as will be evident from the foregoing description of Fig. 1 of the drawings.

Mounted at the top of the box 42 is a panel 48 which carries an on-off switch 50, a check-read switch 51, and a toggle switch 52. The check-read switch 51 is a double-pole, double-throw switch, as hereinafter more fully described, having a spring-positioned, finger-operated plunger 53 extending above the panel 48 and normally held at the read position. With top 44 of the case in closed position switch 50 is normally depressed by a lug 54 carried by top 44 to open the electric circuit. When the top is in the open position lug 54 moves away from the switch 50 which functions automatically to close the electric circuits of the apparatus. Bracket 56 formed on the other side of the top 44 above the toggle switch 52 likewise engages with the toggle switch 52 when top 44 is in closed position to always move the toggle switch to the same side and thus electrically connect the apparatus for operation on the least sensitive gas indicating scale. As hereinafter described the apparatus is adapted to operate on two different scales of sensitivity. In the embodiment of our invention illustrated, the broadest scale is calibrated from zero to 5 per cent of methane and is the upper scale on the dial of the galvanometer 38a carried by the top of the instrument case. The more sensitive scale calibrated from zero to 2 per cent methane is the lower scale shown on the dial of the galvanometer 38a.

Likewise mounted underneath the panel 48 are resistances 62 and 64 adjustable by operating knobs 66 and 68 positioned above the panel 48. A novel part of our invention is the provision of a readily adjustable resistance which once set can be locked against change in its resistance characteristics. In the form of our invention illustrated in Fig. 2 this is accomplished by forming a circumferential channel 70 near the end of shaft 72 connected to the rheostat 62 and providing the knob 66 with a set screw 74 which ordinarily extends into the channel 70 to permit free rotary movement of the knob 66 on the shaft 72. A shoulder 76 at the outer end of channel 72 is formed with one or more slots extending parallel to the axis of shaft 72 and adapted to receive the end of the set screw 74 when the knob is pulled outwardly on the shaft. Thus the knob 66 will be locked to the shaft when pulled outwardly thereon to permit the shaft to be turned by turning the knob. However, when the knob is pushed in on shaft 72, set screw 74 is free to turn in channel 70 so that the knob can not turn the shaft. The knob 66 may be held in the innermost position in any desired manner, as for example, by the provision of an internally threaded cup 78 which receives complementary threads on the end of the knob. This arrangement of parts prevents accidental changing of the adjustment of the resistance 62 once it has been properly set. Case 40 also includes the resistances 32a and 34a and other resistances, all as hereinafter particularly described in conjunction with Fig. 4 of the drawings.

Case 40 is adapted to be carried in any desired manner but is preferably provided with clips 82 to which straps 84 can be releasably secured so that in use, and while being carried by an operator before and after use, the instrument case is suspended from around the neck of the operator so as to hang on the chest of the operator. In making an actual test catches 85 on the sides of the case are released and top 44 is swung back to the position shown in dotted lines in Fig. 3. This presents galvanometer 38a carried by the top of the instrument so that an electric light on the operator's hat is directed toward the meter by the normal inclination of the operator's head in looking down toward the instrument. Aspirator 30a is ordinarily grasped in the right hand and the left hand is free to make the adjustments and take the reading, as hereinafter described.

Referring now to the detailed electrical diagram of the apparatus shown in Fig. 4, parts of the apparatus heretofore described have been identified by similar numerals in Fig. 4 except that the suffix b has been added. The compensator unit 16b and the detector unit 10b are connected by conduit 22b and any desired additional conduit or hose with a source of a gas to be tested. The gas is pulled through the detector and compensator units by aspirator bulb 30b, and ordinarily flash-back arresters 86 and 88 are included before and after the units 10b and 16b. The electric filament of the detector unit 10b is connected by a wire 90 with the station marked C and the other side of the filament is connected by a wire 91 with one end terminal 106 of the switch 51b. The filament of the compensator 16b is connected by a wire 92 to a station marked A and the other side of the compensator filament is connected by a wire 93 to the wire 91. Resistances 32b and 34b are connected to the stations C and A, respectively, as shown, and to the resistance 62b and a shunted resistance 95 which forms a station B. The station C is connected through the resistance 64b to a battery terminal 96, and the station A is connected through the on-off switch 59 and a resistance 98 with a battery terminal 99. A galvanometer 38b is connected to the center poles 100 of the double-pole, double-throw switch 51b having one set of end terminals 102 connected, respectively, to the station B and through a resistance 105 to the station C. The other set of end terminals 106 of the double-pole, double-throw switch 51b are connected, respectively, to the wire 93 and by a wire 108 to the station B. Connected to one side of the galvanometer 38b is a wire 110 which extends to a variable resistance 111 which is in turn connected through a variable resistance 112 to the station B. Switch 52b shorts out the resistance 111 when closed to change the scale reading of the galvanometer 38b, as heretofore generally described.

Before considering the operation of the detailed construction of our invention as just described, it will be helpful to a complete understanding of our advance in the art to consider the importance of the stabilization in the Wheatstone bridge testing circuit of the operating temperature of the detector and compensator filaments. First, in order to properly burn any combustible content in the gas tested the detector filament must operate at a temperature that is high enough to cause some evaporation of metal from the filament. Thus the filament becomes thinner with use and its resistance increases. However, during the useful life of the detector filament its operating temperature can be maintained constant by maintaining the voltage applied to it constant.

Now, in the operation of the apparatus the voltage drop across the detector is kept constant regardless of the gradual drain in use of the operating battery by testing and setting the voltage before each operation of the apparatus. This is accomplished in the apparatus electrically connected as shown in Fig. 4, by pushing and holding the plunger 53 down to throw the double-pole, double-throw switch 51b to the check position so that the galvanometer 38b is connected across the resistance 32b. The resistance 64b is then adjusted by knob 68 so that the reading on the galvanometer indicates the same voltage drop before each test. Ordinarily the dial or the glass cover of the galvanometer is provided with a check position marking and when by adjustment of the resistance 64b the pointer of the galvanometer is brought to the check marking on the galvanometer, the same amount of voltage will be applied to the resistance 32b and thus, if the bridge is balanced also, through the detector filament during the testing operation. If the adjustment of the resistance 64b will not bring the pointer of the galvanometer 38b to the check marking the battery is not sufficiently strong due to its gradual discharge, and a new battery should be employed.

We are able to check for and insure that the same voltage is applied to, or more accurately phrased, the same voltage drop occurs across the detector filament in the manner just described for the reason that the branch between stations B and C of the Wheatstone bridge has the same voltage drop as the voltage drop across the detector filament in parallel therewith when the bridge is balanced and there is no flow of current through the cross arm between stations B and D of the Wheatstone bridge. When the bridge is balanced it will be understood that the voltage drop may be measured either between the stations C and D or between stations C and B as just described. However, when the apparatus is in a gaseous atmosphere, for example, a mine and the bridge is out of balance due to the presence of combustible gas around the detector filament, we can still check the voltage drop between the stations B and C and set the voltage to check position by a voltmeter or by switching over the galvanometer 38b, and resistance 105, as described in the preceding paragraph. To be able to make the voltage adjustment not only in fresh air but also when in a gaseous atmosphere, renders this arrangement of checking between stations B and C decidedly preferable to measuring the voltage drop across the detector. When gas having a combustible content is admitted to the detector filament the resistance thereof increases and a voltmeter applied to the ends of the filament would show a reading which is increased very nearly in proportion to the increase in resistance or to the combustible gas concentration which caused it. On the other hand, a voltmeter applied to the parallel bridge branch CB shows a considerably smaller increase in reading. This is due to the fact that the fractional increase in the bridge voltage is less than the corresponding increase in detector voltage as caused by presence of combustible gas around the detector filament. A very important further improvement to decrease the change in voltmeter indication by gas burning at the detector filament during the checking is obtained by disconnecting or opening the cross branch BD through the agency of switch 51b heretofore described and shown in Fig. 4.

If the cross-branch BD is closed at the time the voltage check is made between stations C and B, the galvanometer current is flowing when the bridge is unbalanced by gas burning at the detector filament. As a result the current flowing through the compensator filament will increase and thereby decrease the magnitude of the normal tendency for the compensator filament to receive less current when the detector filament is operating at higher temperature and greater resistance. The increased current through the branch CB will directly contribute to the voltage drop across this branch. Therefore, if the detector voltage is checked across the branch CB with the galvanometer circuit or cross-branch BD closed the fractional increase in voltage drop across the branch CB, due to the induction of gas, will be greater than the corresponding reading made with the cross-branch BD open.

In one model of our instrument we obtain a change in the check reading of less than 2 per cent, even when a gas concentration of 90 per cent of the lower explosive limit is admitted to the detector. Resetting the applied voltage in a gaseous atmosphere produces an error of smaller than 5 per cent of the reading value. Instead of disconnecting or opening the cross-branch, it is possible to obtain the same result by reducing the current in this branch to zero or nearly to zero as by the insertion of a large resistance therein.

When the double-pole, double-throw switch 51b is thrown to the lower set of contacts 106 by releasing the plunger 53, the apparatus is in the read position and is ready for a testing operation.

It is believed that the operation of the apparatus shown in Figs. 2 to 4 and heretofore described will be evident from the foregoing description. Briefly reviewing this operation, however, the apparatus, ordinarily carried on the chest or at the waist of the operator, is first initially adjusted in fresh air by opening the top of the instrument and adjusting the check setting by turning the knob 68 of resistance 64 until the galvanometer pointer is in alignment with the check setting marked on the dial. Fresh air is now drawn through the instrument by operating the bulb 30 and the apparatus is adjusted to electrical zero by throwing the scale switch 52 to its most sensitive position (in Fig. 4 this is accomplished by opening switch 52b). If the instrument is properly adjusted the galvanometer will be at zero. If the adjustment is incorrect the knob 66 is turned as heretofore described so as to lock it with shaft 72 of the resistance 62. The knob is now turned while locked on the shaft and the adjustment of the galvanometer is brought to zero. The check setting is readjusted and the electrical zero is again adjusted and the knob 66 is then disengaged from the shaft and locked in place. No further adjustment of the resistance 62 is required for several hours and this should always be made in pure air. The adjustment to electrical zero is nesessary periodically due to the fact that the detector filament is subjected to high temperatures when combustible gas is passed thereover and the filament gradually evaporates. Its resistance, therefore, changes gradually in use necessitating rebalancing of the bridge circuit.

With the instrument calibrated as described, it is taken wherever it is desired to sample the gas or air for combustible content and the cover is opened which causes switch 50 to close the electric circuit. If the instrument has stood for any amount of time since adjusting as just described or if a different battery is employed therewith then the flow of electric current must be brought again to the check setting just before use as will be understood, and this can be done in or out of a combustible gas-containing atmosphere, as stated heretofore. In all events the conduit 24 connected to the side of the instrument case is extended to the exact point from which the gas sample is to be drawn, or if the sample is to be taken from atmosphere of a room or chamber no conduit 24 is required. Gas is now drawn through the detector and compensator units by aspirating the bulb 30 and with the switch 52b closed the galvanometer will show an indication of the combustible gas content present on the upper scale thereof. If the content is below 2 per cent the switch 52 is moved to the other or open position so that a more accurate determination of the exact percentage of combustible gas can be read on the lower scale. The operation of the various parts of the instrument and particularly the reading on the galvanometer scale is easily made under only the light of an electric miner's lamp on the hat of the test operator due to the inclined position of the galvanometer 33 as carried in the top 44 of the case.

Any desired number of readings can be made in the next several hours without resetting the electrical zero or disturbing the locked knob 66. The knob 68 of the resistance 64 should, however, be adjusted to bring the galvanometer pointer under the check setting mark prior to each test made by the instrument, as above described.

An important feature of our invention which has not heretofore been described in detail, and which is essential to the successful operation of the apparatus is the stabilization of the circuit. A variation of the applied bridge voltage should not influence the balance of the bridge. As the bridge voltage is varied the current flowing through the detector and compensator filaments changes. As a result, the resistances of these filaments change. The compensator filament being normally of thicker wire than the detector filament experiences a different rate of change of resistance with respect to its heating current than does the detector filament. The compensator filament must therefore be of such length that its resistance and the change of that resistance produced by a given change of current are always of such value that when used in conjunction with the resistance of the detector filament and its change of resistance produced by the same change of current the balanced condition of the bridge must be substantially satisfied for currents and voltage of the magnitude of the correct operating amount.

The above condition may be derived mathematically and may be more precisely stated in such terms. Let the resistances of the various bridge arms at a certain current near the value for correct operation be designated when the bridge is in balance by the standard Wheatstone bridge formula as follows:

(1)
$$\frac{R_{CD}}{R_{DA}} = \frac{R_{CB}}{R_{BA}}$$

then (1a) $(R_{CD} \times R_{BA}) - (R_{CB} \times R_{DA}) = 0$

Assume the current passing through the filaments varies by an incremental amount equal to $\Delta i$. As a result of this variation the detector and compensator resistance vary by amounts $\Delta R_{CD}$ and $\Delta R_{DA}$. If the bridge is to remain balanced under the new current condition it will be necessary that $$\frac{R_{CD} + \Delta R_{CD}}{R_{DA} \Delta R_{DA}} = \frac{R_{CB}}{R_{BA}}$$

which reduces to $(R_{CD} \times R_{BA}) + (\Delta R_{CD} \times R_{BA}) =$
$\qquad (R_{CB} \times R_{DA}) + (R_{CB} \times \Delta R_{DA})$ and $(R_{CD} \times R_{BA}) - (R_{CB} \times R_{DA}) =$
$\qquad (\Delta R_{DA} \times R_{CB}) - (\Delta R_{CD} \times R_{BA})$ The left-hand portion of this equation is equal to 0 by virtue of Equation (1a) above, therefore $(\Delta R_{DA} \times R_{CB}) - (R_{CD} \times R_{BA}) = 0$ which may be written $$\frac{\Delta R_{CD}}{\Delta R_{DA}} = \frac{R_{CB}}{R_{BA}}$$

by virtue of Equation (1) above this equation reduces to $$\frac{\Delta R_{CD}}{\Delta R_{DA}} = \frac{R_{CD}}{R_{DA}}$$

This formula represents the generalized balanced condition and expresses the following: If the variations of the resistances of the filaments produced by an incremental change of current are proportional to the resistances of the filaments themselves the bridge balance is substantially independent of the bridge current or of the applied voltage.

In our indicator the compensator filament operates at a temperature below that of the detector filament. If the compensator filament is made of a material similar or identical to that of the detector filament it is necessary that the diameter of the compensator filament be greater than that of the detector filament. For any given diameter of compensator filament wire there is an optimum length of filament for satisfactory stability of bridge balance against variations of bridge potential. Increasing the compensator filament diameter in order to gain a lower operating temperature requires an increased length of compensator filament. The increase of resistance of the filament due to this increased length is not as great as the decrease of resistance due to its increased diameter. A properly stabilized compensator filament will in general have a resistance less than that of the detector against which it is stabilized.

The stabilization of the circuit balance against variations resulting from changes of filament current or applied voltage affects the operation of the instrument in several different ways. First, the accuracy with which the detector voltage check can be set depends upon the accuracy of the galvanometer, the angle from which the pointer is viewed, the judgment of the operator, variations of contact resistance and the like. Errors of this setting as great as 3 per cent or 4 per cent may be experienced in circuits not closely complying with the balance requirements heretofore discussed. The variations of the check setting may easily be responsible for a shift of the zero setting equivalent to 20 per cent or more of the scale range of the instrument. If the check setting is made in a gaseous atmosphere where there is no possibility of adjusting the zero setting the resultant reading would be in error by the amount of the shift of the zero. Our method of operating the indicator in a gaseous atmosphere depends upon the good zero stability of the circuit.

As heretofore recited, a principal feature of our apparatus is the exposure of the compensator filament to the sample flow in order to provide compensation against errors arising from variations of the relative humidity of the sample, its atmospheric pressure, temperature and rate of flow. Each of these factors, together with changes of battery voltage, tipping of the instrument and the like, affects the cooling and influences the resistance of the detector and compensator filaments.

The stabilization of the circuit balance against changes arising from variation in the battery voltage applied to the circuit has important effects in several other characteristics of the performance of the apparatus. In a circuit with detector and compensator filaments of proportion affecting a correct bridge balance even with variations in their heating current all of the electric power lost in each filament is converted into heat. After a condition of constant filament temperature has been reached all of the electric power supplied to the filaments must be lost by it directly through radiation or through the assistance of the surrounding gas by conduction or convection. Any variation of the electric power input causes a change of the filament temperature and consequent filament resistance. The filament heat losses adjust themselves to this new condition in such a way that they again become equal to the input power. If the circuit is balanced it is necessary that the filament construction in so far as power losses are concerned be such that any change in power dissipation of the two filaments results in a filament temperature and hence filament resistance changes which are of the order required by the fundamental bridge stability equation developed above, i. e., $$\frac{\Delta R_{CA}}{\Delta R_{DA}} = \frac{R_{CD}}{R_{DA}}$$

The important feature in stabilization is that the power dissipation of the filaments through the surrounding gas is of such magnitude that the stability equation is satisfied. Stability of bridge balance against variations of filament current is the result, therefore, of stability of the more fundamental balance against variations of the gaseous cooling losses of the filaments. All disturbing influences which affect the rate of cooling of both detector and compensator filaments are compensated for and the balance of the circuit can be disturbed only by combustion of the flammable material of the sample of gas tested, since this can affect only the heat dissipation of the detector filament.

Although it is believed that those skilled in the art can from the preceding discussion provide fundamentally stabilized Wheatstone bridge testing circuits, including detector and compensator filaments over which the gas sample is passed, particularly in view of our disclosure above of the general size and length of the compensator and detector filaments, we here provide a typical example of our construction. We employ, for example, a detector filament having a resistance of about 2.50 ohms at about 460° C. average temperature which is made of platinum wire having a diameter of about .002 inch and a length of about .50 inch. The detector filament is shaped as a helix, being coiled on a diameter of about .020 inch and having the individual turns spaced on a pitch of about .0159 inch per turn. The detector filament is supported at its ends and is held so that its axis is parallel to a surrounding housing which is spaced about 3/8 inch from the filament, and which is formed from brass having a radial thickness of about 1/8 inch.

We employ, for example, a compensator filament having a resistance of about 2.10 at about 340° C. average temperature which is made of platinum wire having a diameter of about .0022 inch and a length of about .57 inch. The compensator filament is shaped as a helix, being coiled on a diameter of about .020 inch and having the individual turns spaced on a pitch of about .0159 inch. The compensator filament is supported at its ends and is held so that its axis is parallel to a surrounding housing which is spaced about 3/8 inch from the filament, and which is formed from brass having a radial thickness of about 1/8 inch.

Resistance 32b is between about 8 and about 13 ohms and generally is about 10.5 ohms. Resistance 34b is between about 7 and about 11 ohms and generally is about 9 ohms. Resistance 62b is between about 1 and about 5 ohms and generally is about 3 ohms. The Wheatstone bridge circuit as heretofore set forth, provided with the detector and compensator filaments and the several resistances shown particularly in Fig. 4 and connected as therein illustrated, is in a stabilized condition and fulfills the requirements of continued stability under changes in operating voltage as discussed above.

From the foregoing it will be seen that the objects of our invention have been achieved by the provision of improved methods and apparatus for testing gas and particularly for determining the presence and amount of combustible gas in air, as for example methane in mine atmospheres. The apparatus and methods herein provided are simplified and improved over known methods and apparatus and greatly facilitate the determination of combustible gas contents in air by ordinary operators under a variety of conditions.

While in accordance with the Patent Statutes, one embodiment of our invention has been illustrated and described in detail, it should be appreciated that the invention is not limited thereto or thereby but is defined in the appended claims.

We claim:

1. In a method of gas testing which employs electrically heated detector and compensator filaments in a Wheatstone bridge circuit, the steps of balancing the bridge circuit, maintaining a constant voltage drop across the detector filament by measuring the voltage drop in the branch of the Wheatstone bridge which is electrically parallel with the detector filament, simultaneously preventing current flow through the cross-connection between the two parallel branches of the bridge, closing the cross-connection, passing the gas to be tested over both the detector and compensator filaments, and measuring the difference in potential at the ends of the cross-connection due to the combustible content of the gas burning at the detector filament.

2. In a method of gas testing which employs electrically heated detector and compensator filaments in a Wheatstone bridge circuit, the steps of balancing the bridge circuit, maintaining a constant voltage drop across the detector filament by measuring and adjusting by means outside the Wheatstone bridge the voltage drop in the branch of the Wheatstone bridge which is electrically in parallel with the detector filament, and simultaneously electrically opening the cross-connection between the two parallel branches of the bridge.

3. Gas testing apparatus comprising a case, a top pivotally carried on the case and mounted for movement from a closed position covering the case to an open position exposing the inside of the case, a galvanometer carried by the top and in the closed position of the top being positioned with its face substantially vertical and in the open position of the top being positioned from between about 30 and about 70 degrees with the horizontal, four resistances connected to form an electric Wheatstone bridge in the case, two of the resistances being connected in series and comprising detector and compensator filaments, a housing surrounding each filament, means for passing a gas to be sampled through the housings, switch means for connecting the galvanometer either in the cross-branch of the Wheatstone bridge in a reading position or in a check position across the branch of the bridge in parallel with the detector filament and keeping the cross-branch open, means for adjusting the voltage drop across the last-named resistance prior to test, means for adjusting the apparatus to electrical zero, means for locking the last-named means in inoperative position, one of said filaments being of greater cross-section than the other, and an oxidized layer of inactive metal plated on the larger filament.

4. Gas testing apparatus comprising a case, a top pivotally carried on the case and mounted for movement from a closed position covering the case to an open position exposing the inside of the case, a galvanometer carried by the top and in the closed position of the top being positioned with its face substantially vertical and in the open position of the top being positioned from between about 30 and about 70 degrees with the horizontal, four resistances connected to form an electric Wheatstone bridge in the case, two of the resistances being connected in series and comprising detector and compensator filaments, a housing surrounding each filament, means for passing a gas to be sampled through the housings, switch means for connecting the galvanometer either in the cross-branch of the Wheatstone bridge in a reading position or in a check position across the branch of the bridge in parallel with the detector filament, said switch means when in check position keeping the cross-branch open, means for adjusting the voltage drop across the last-named resistance prior to test, and means for adjusting the apparatus to electrical zero.

5. Gas testing apparatus comprising a case, four resistances connected to form an electric Wheatstone bridge in the case, two of the resistances being connected in series and comprising detector and compensator filaments, a housing surrounding each filament, means for passing a gas to be sampled through the housings, switch means for connecting the galvanometer either in the cross-branch of the Wheatstone bridge in a reading position or in a check position across the branch of the bridge in parallel with the detector filament and keeping the cross-branch open when in check position, means for adjusting the voltage drop across the last-named resistance prior to test, means for adjusting the apparatus to electrical zero, means for locking the last-named means in inoperative position, one of said filaments being of greater length and cross-section than the other, and a layer of inactive metal plated on the larger filament and oxidized prior to the use of the filament to a constant state of oxidation.

6. Gas testing apparatus comprising a case, four resistances connected to form an electric Wheatstone bridge in the case, two of the resistances being connected in series and comprising filaments, a housing surrounding each filament, means for passing a gas to be sampled through both housings, one of said filaments being of greater length and cross-section than the other, and an oxidizable layer of inactive metal plated on the larger filament, and treated prior to the use of the filament to a constant state of oxidation.

7. Apparatus for determining the presence and amount of combustible gas present in air or the like comprising a Wheatstone bridge formed of two filaments connected in series and two resistances connected in series, the filaments and resistances being connected in parallel, a galvanometer, means for connecting the galvanometer between the resistances and the filaments in a bridged reading position, means for connecting the galvanometer in a checking position across the resistance which is parallel to the detector and for simultaneously opening the bridge connection, means for supplying electric current to the filaments, and means for adjusting the voltage applied to the bridge.

8. Apparatus for determining the presence and amount of combustible gas present in air or the like comprising a Wheatstone bridge formed of two filaments connected in series and two resistances connected in series, the filaments and resistances being connected in parallel, a galvanometer, means for connecting the galvanometer between the resistances and the filaments in a bridged reading position, and means for connecting the galvanometer in a checking position across the resistance which is parallel to the detector and for simultaneously opening the bridge connections.

9. In a combustible gas indicator for use in poor light conditions, as for example in a mine, a case containing the indicator, means for holding the case on the chest of an operator, a hinged top on the case, an electric meter in the hinged top mounted with the meter face substantially vertical when the top is in its closed position, a stop limiting the opening movement of the top and holding it in a tilted position permitting the ready reading of the meter from a miner's cap lamp worn by the operator.

10. A combustible gas indicator including a case, a top removably carried over the case, an on-off switch for the indicator carried by the case and resiliently held in the on position, means on the top engaging with the switch to move it to the off position when the top is closed over the case, a switch for operating the indicator at either a high or a low range of sensitivity, and means carried by the top for moving the switch to the less sensitive range by the closing of the top over the case and for leaving it in this position when the top is opened again for operation.

11. A combustible gas indicator including a case, a top removably carried over the case, a switch for operating the indicator at either a high or a low range of sensitivity, and means carried by the top for moving the switch to the less sensitive range by the closing of the top over the case and for leaving it in this position when the top is opened again for operation.

12. That method of gas testing with a Wheatstone bridge having a detector filament which includes the step of determining and adjusting the voltage across the detector filament by measuring and adjusting the voltage across the arm of the Wheatstone bridge in parallel with the detector filament while the circuit is balanced.

13. Apparatus for gas testing and including a Wheatstone bridge circuit, detector and compensator filaments in the circuit over which the gas to be tested is passed, means for balancing the Wheatstone bridge, and means for determining the voltage across the detector filament by measuring the voltage across an arm of the Wheatstone bridge in parallel with the detector.

MOSES G. JACOBSON.
RALPH E. HARTLINE.

CERTIFICATE OF CORRECTION.

Patent No. 2,244,366. June 3, 1941.

MOSES G. JACOBSON, ET AL.

It is hereby certified that error appears in the printed specification of the above numbered patent requiring correction as follows: Page 5, first column, line 64, in the equation, for "$(R_{CD} X R_{BA})$" read --$(\Delta R_{CD} X R_{BA})$--; page 7, first column, line 63, claim 6, for the word "treated" read --heated--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.